United States Patent [19]

Jorgensen

[11] 4,378,764

[45] Apr. 5, 1983

[54] PISTON AND COMBUSTION CHAMBER WITH IMPROVED FUEL CIRCULATION

[76] Inventor: Adam A. Jorgensen, 1911 NW. 36 St., Oakland Park, Fla. 33309

[21] Appl. No.: 325,141

[22] Filed: Nov. 27, 1981

[51] Int. Cl.³ .............................................. F02F 3/24
[52] U.S. Cl. .................................. 123/307; 123/290; 123/193 P; 123/193 CH; 123/193 H
[58] Field of Search ............... 123/289, 290, 306, 307, 123/193 P, 193 CP, 193 H, 193 CH

[56] References Cited

U.S. PATENT DOCUMENTS

| | | | |
|---|---|---|---|
| 1,722,517 | 7/1929 | Curtis | 123/290 |
| 2,688,320 | 9/1954 | Czarnocki | 123/193 CP |
| 2,735,416 | 2/1956 | Ferguson et al. | 123/193 CP |
| 4,026,250 | 5/1977 | Funiciello | 123/289 |
| 4,235,203 | 11/1980 | Thery | 123/193 P |

FOREIGN PATENT DOCUMENTS

| | | | |
|---|---|---|---|
| 645974 | 5/1937 | Fed. Rep. of Germany | 123/290 |
| 2309718 | 11/1976 | France | 123/193 CP |
| 52-40210 | 3/1977 | Japan | 123/193 CP |
| 60781 | 10/1947 | Netherlands | 123/290 |
| 299807 | 9/1929 | United Kingdom | 123/307 |

*Primary Examiner*—P. S. Lall
*Attorney, Agent, or Firm*—Oltman & Flynn

[57] ABSTRACT

An internal combustion engine, which has a combustion chamber with a coordinated piston where the combustion chamber is divided into a first and second section, and where the piston has an extension which slides into the second chamber section during the later part of the piston's upward movement, and compresses the fuel-air mixture contained in that chamber section to a pressure somewhat higher than the pressure in the first section. The second chamber wall and the piston extension has two air passages, which are coordinated in such a way that during the last part of the compression cycle, the air passages overlap and provide an escape passage for the fuel-air mixture in the second section which is released suddenly into the first combustion chamber section and sets the fuel-air mixture in that section in a swirling motion, which helps to better mix the fuel and the air, and facilitates the ignition process of a lean mixture when used with a suitably adapted, extended electric spark ignition. The invention is also applicable to an engine of the diesel type and to two cycle engines.

15 Claims, 13 Drawing Figures

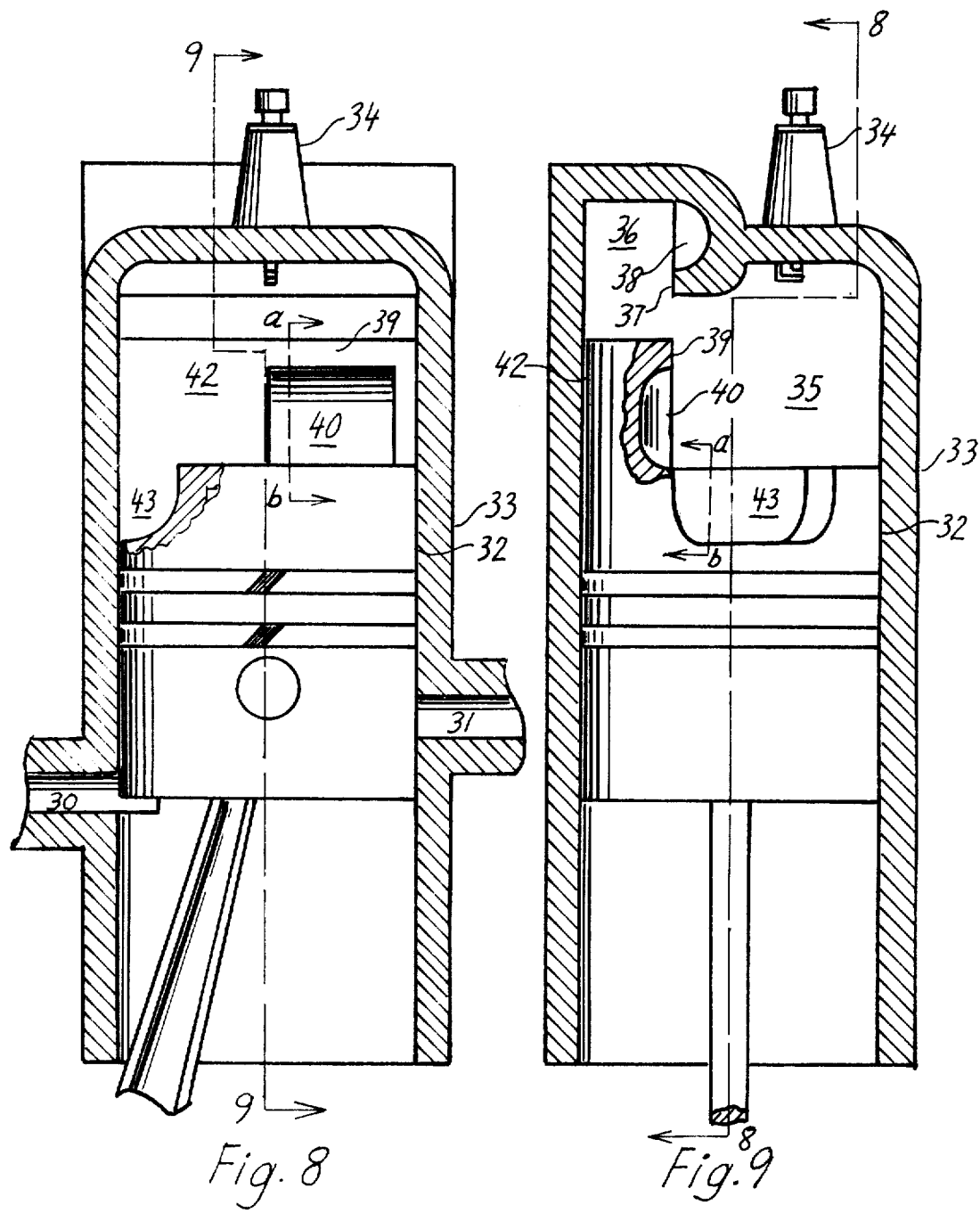

PISTON AND COMBUSTION CHAMBER WITH IMPROVED FUEL CIRCULATION

GENERAL BACKGROUND

In modern internal combustion engines having reciprocating pistons in cylinders driven by combustion of a mixture of fuel and air, there has, in recent years, been a development toward the use of lower fuel to air ratio of the mixtures or so-called leaner mixtures. The ideal fuel-air mixture is a so-called stoechiometric mixture which has a ratio of fuel to air, such that complete combustion of the fuel is attained. Under this condition, there is a minimum of undesirable polluting by-products, which, in turns, leads to a combustion with the highest possible degree of fuel efficiency.

The leaner mixture, however, suffers from the drawbacks that it is difficult to ignite and that the flamefront of the burning air mass moves through the fuel-air mixture at lower speeds.

In addition, during operation at reduced power and especially during idling, the fuel-air mixture is of very low pressure and also, for that reason, difficult to ignite. In present engines, additional fuel is supplied to the fuel-air mixture during idling. That additional fuel not only causes loss and increased pollution, but also causes increased engine wear. The present invention makes it possible to ignite and burn such a low pressure, lean mixture without additional fuel enrichment.

For those reasons, engine designers have introduced various means to improve the ignition process, such as the provision of multiple spark plugs, more powerful sparks of longer duration, the provision of a separate combustion chamber with a separate intake valve and carburetor and where the ignition is started by means of a small amount of a richer mixture. A version of an ignition system providing more powerful sparks of longer duration, is described in copending application entitled Ignition with Power Boosting Arrangement, application Ser. No. 265,669.

It stands to reason, and can be shown, that a spark plug providing a spark of longer duration will not have much benefit, unless the fuel-air mixture is in motion during the time of ignition so that a larger amount of fuel-air mixture is exposed to the spark during the ignition time.

Various inventors have proposed combustion chambers of such a construction that a swirling motion is imparted to the fuel-air mixture during both the intake cycle and during the compression cycle, in order to provide a better combustion.

An example of an internal combustion engine having a specially constructed combustion chamber and piston which provides additional swirling motion of the fuel-air mixture, is described in U.S. Pat. No. 4,026,250, issued Mar. 13, 1979. Another example of such an engine is described in U.S. Pat. No. 4,280,459, granted July 28, 1981.

The present invention discloses a special construction of a combustion chamber with a corresponding piston, which provides an especially strong swirling motion of the fuel-air mixture at the time of ignition, and such that the swirling fuel-air mass can be directed toward the spark gap of the spark plug. By further providing an ignition system which delivers a powerful spark of appropriately extended duration, a highly efficient combustion of a lean fuel-air mixture can be attained.

The swirling motion imparted to the fuel-air mixture by the present invention provides the additional beneficial effect that a more intimate and homogeneous fuel-air mixture is attained, which further enhances the quality of the combustion process.

The problems described above, relating to the use of a lean fuel-air mixture are exacerbated by the fact that modern internal combustion engines are required to operate at increasingly higher rotational speeds, in order to attain weight and space reductions of the engine which is required in the overall effort to improve fuel efficiency.

It is, therefore, an important object of the present invention to provide a piston and combustion chamber for an internal combustion engine such constructed that a more complete combustion is attained.

It is another important object of the present invention to provide a piston and combustion chamber for an internal combustion engine that is capable of igniting and burning a lean fuel-air mixture.

It is another important object of the present invention to provide a piston and combustion chamber for an internal combustion engine such constructed that a cleaner combustion with fewer polluting combustion by-products is attained.

It is still another object of the present invention to provide a piston and combustion chamber of such a construction that a more complete and cleaner combustion is attained for an engine operating at a high speed of rotation.

It is still another object of the invention to provide a piston and combustion chamber of such a construction that there is less tendency to engine knocking from premature ignition.

It is still another object of the present invention to provide a piston and combustion chamber of such a construction that the aforesaid objects are attained with a construction that is simple and robust, without the use of additional construction parts.

BRIEF DESCRIPTION OF THE DRAWINGS

FIG. 8 is a diagrammatic, vertical, part cross-sectional view through cylinder with elevational view of piston of a two-cycle engine, seen along the line 8—8 in FIG. 9.

FIG. 9 is a diagrammatic, vertical, part cross-sectional view through cylinder with elevational view of piston, along the line 9—9 in FIG. 8.

DETAILED DESCRIPTION

The following detailed description of a number of preferred embodiments of the present invention is, for the purpose of facilitating the description, based on the assumption that the cylinder is oriented vertically with the cylinder head and the combustion chamber at the top, although the cylinder may, as well, be used with a different orientation. The description of the first preferred embodiment is based on a four (4) cycle engine with overhead valves and a piston reciprocating between an upper top and a lower dead center, and connected through a connecting rod to a crankshaft. These details are well known in the art of engine design, and have been extensively described in the literature on internal combustion engines, and since the present invention is not directed toward these details, they are not shown in the figures. It should also be understood, that the figures are diagrammatic, and many practical details have been left out since they are without direct relation to the present invention. Some of the details left out are means for cooling, means for operating the valves, valve guides, lubricating means and so forth. The fuel-air mixture may be created in a conventional carburetor, but the invention may readily be applied to an engine with direct fuel injection by simple modifications that would be obvious to those skilled in the art of engine design. It should further be noted that the figures supporting this specification are diagrammatic, and for the purpose of illustrating the present invention, and do not include many mechanical details such as rounding of corners and edges, and fairing of the air passages as is normally done in practical engines.

It has further been assumed for the sake of description, that a second combustion chamber section which is an element of the invention, is physically positioned above a first combustion chamber section. It is to be understood, however, that said two combustion chamber sections, within the scope of the invention, may as well be reversed in positions, such that said second combustion chamber section is instead positioned underneath said first section.

Figure 1:
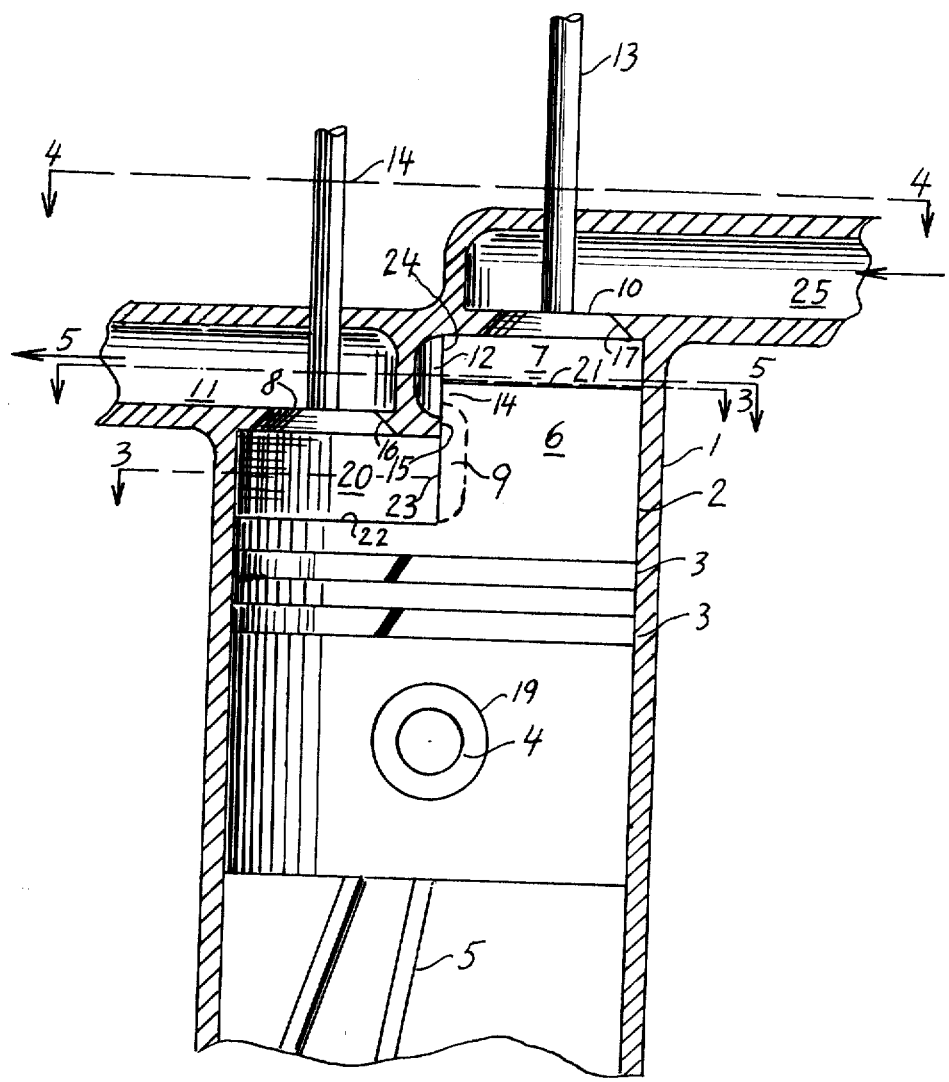
FIG. 1 is a diagrammatic, longitudinal part cross-sectional view of a cylinder along the line 1—1 of FIG. 3, with elevational view of piston.

FIG. 1 shows an internal combustion engine of the four (4) cycle type having a cylinder 1 containing a piston 2, connected with connecting rod 5 to a crankshaft not shown. The crankshaft rotating at a generally constant speed of rotation causes the piston to move between an upper top and a lower dead center in a reciprocating motion at a linear velocity that is generally a sinusoidal function of the angular velocity of the crankshaft.

An intake port generally at 25, and an outlet port generally at 11 communicate with the cylindrical space defined by the inner walls of the cylinder 1 and the reciprocating top surface of the piston 2 through two (2) poppet valves, the intake valve 10 seated in valve seat 17 and exhaust valve 8 seated in valve seat 16. The two (2) valves are connected with valve stems 13 and 14 to valve operating means that are not shown. The upper part of the cylinder's inner space is defined as the combustion chamber.

Figure 2:
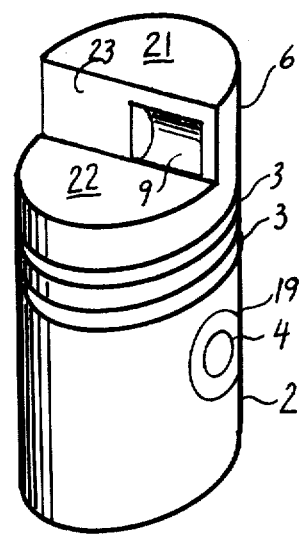
FIG. 2 is a longitudinal perspective view of piston.
Figure 3:
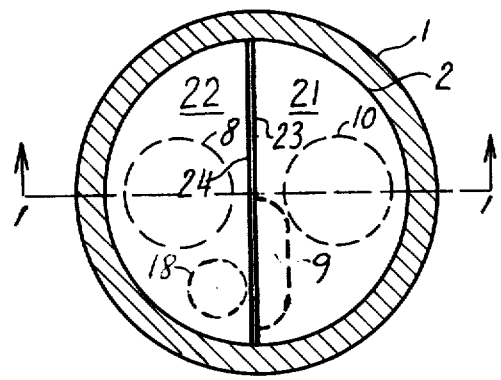
FIG. 3 is a transverse, cross-sectional view through a cylinder along the line 3—3 of FIG. 1, with an end view of the piston and showing outline of intake and exhaust valves and sparkplug in phantom lines.
Figure 4:
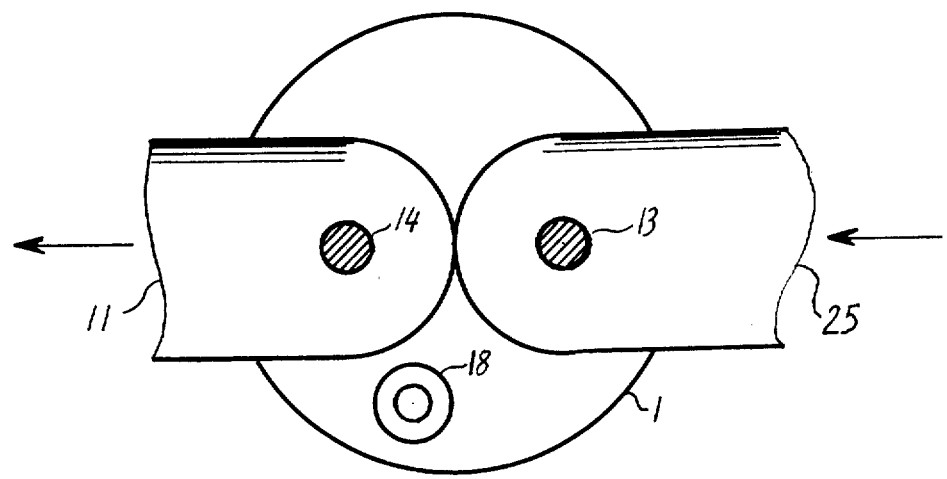
FIG. 4 is an end view of cylinder, showing outline of intake and exhaust manifolds and sparkplug, along the line 4—4 in FIG. 1.
Figure 5:
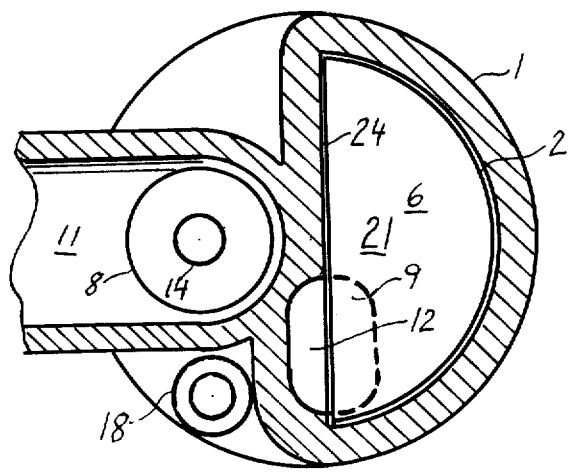
FIG. 5 is a transverse, cross-sectional view through a cylinder with end view of piston, along the line 5—5 in FIG. 1.

In actual engine design, much attention is directed toward the geometry of the combustion chamber and the size and positioning of the valves and the spark plug, in order to attain the best possible conditions for efficient and rapid engine operation. Similar considerations apply to an engine according to the present invention, and can be applied by suitable modification of the presently described embodiment. In the present invention, the combustion chamber is divided into two (2) sections, the upper second section 7 and the lower first section 20. The upper surface of the piston 2 is divided into two surface sections, 21 and 22. FIG. 2, which is a longitudinal perspective view of the piston, shows that surface section 21 which is raised above surface section 22, and which defines the upper surface of an extension 6 of the top of the piston 2. The extension 6 is shown as a circular disc cut in half by a diagonal. A vertical rectangular wall 23, defined by said diagonal, provides the inner boundry for said extension, while the vertically extended outer cylindrical wall of the piston provides the outer boundry. An indentation 9 in said vertical wall serves to communicate with another matching indentation 12 in the vertical wall of the combustion chamber section 7, such that said two (2) indentations provide an air passage from combustion chamber section 7 to section 20 when the piston approaches its top dead center, as explained in more detail below. The indentation 9 is shown in dotted lines in FIGS. 1, 3 and 5. The indentation 9 in the piston extension 6 creates a lip 14; the indentation 12 in the cylinder creates a lip 15.

The upper combustion chamber section, generally at 7, is constructed to receive the piston extension 6 in an as closely fitting slidable connection as allowed by the dimensional tolerances of the piston within the cylinder walls. In practical engines, this tolerance is typically of a magnitude of a few thousandths of an inch, but may be larger in engines operating at higher temperatures.

When the piston is at its top dead center, the piston extension 6 will completely fill the combustion chamber section 7 within the tolerances mentioned above. In this position, the section 20 of the combustion chamber defines a space which is bounded by the cylindrical inner cylinder wall, the lower surface section 22 of the piston top and the lower surface of the poppet valve 8 and the adjoining inner surface of the combustion chamber section 20. A wrist pin 4 with bearing 19 serves as the point of connection between the piston 2 and the connecting rod 5. Two piston rings 3 serve to seal the combustion chamber sections 7 and 20 against loss of compression.

OPERATION

The operation of the engine according to the present invention takes place in a sequence of four (4) cycles that are identical to those of a conventional four (4) cycle internal combustion engine, namely intake, compression, combustion and exhaust cycle respectively. The compression cycle and the ignition phase which takes place shortly before the end of the compression cycle and the beginning of the combustion cycle is different in the engine of the present invention and will be described in more detail below.

Beginning with the intake cycle, the intake valve 10 is opened by the valve operating means as the piston starts its downward movement. The piston draws fuel-air mixture from the intake port 25 into the cylinder. As the piston comes to the end of the intake cycle and the cylinder is filled with fuel-air mixture, the intake valve 10 is closed, and the piston starts to move upward, beginning the compression cycle, during which time both valves are maintained closed. During the compression cycle, as the piston moves upward, the fuel-air mixture is compressed above the piston into a steadily decreasing volume, while the pressure in that volume is increasing such that the increasing pressure increases according to a generally adiabatic curve, since only a small amount of the heat generated by the compression of the fuel-air mixture has enough time to escape through the surrounding walls during the compression cycle.

At a certain point X1 on the piston's upward movement, where X represents the distance from the piston's lower dead center, the two (2) chambers 20 and 7 are no longer interconnected, because the vertical wall 23 of the piston extension 6 and the vertical wall 24 bounding the chamber section 7 start to overlap, thereby separating the two (2) chamber sections 20 and 7.

FIG. 6a, which assumes that the engine ignition is disconnected, illustrates in diagrammatic form and in more detail, the pressure in the cylinder as a function of the position X of the piston in the cylinder during the compression cycle, using the top of the piston as the X coordinate and the pressure P as the Y coordinate. FIGS. 6b, c, d and e show the piston in four (4) different positions. The dimensions shown on the figures are exaggerated in order to better illustrate the operation. In FIG. 6b, the various parts of the piston and cylinder are designated by their reference numbers described above.

FIG. 6e shows the piston in lower dead center. In this state, the cylinder is filled with fuel-air mixture at atmospheric pressure shown in FIG. 6a as 1, and the piston is beginning to move up toward the top dead center. FIG. 6d shows the piston as it has moved to point $X = X1$, where the pressure P has increased adicbatically to $P = P1$. At this point, the top of the piston extension 6 is beginning to enter the matching combustion chamber section 7 and the two (2) lips, the stationary lip 15 and the moving lip 14, are beginning to overlap and to separate the two (2) combustion chamber sections 7 and 20. Since the remaining space in the two (2) chamber sections are different, the pressure from this point increases at different rates in the two chamber sections. It follows that the remaining space in chamber section 7 is less than the space remaining in chamber section 20 because, as stated above, at the top dead center, the extension 6 of the piston will completely fill the matching chamber section 7, while additional residual space is provided in chamber section 20 in order to contain the compressed fuel-air mass at pressure P3 at the end of the compression cycle. The pressure P3 is a function of the engine construction, the operating temperature, the type of fuel used and several other factors. P3 is chosen by the engine designer to be as high as possible, but such that premature ignition of the fuel-air mixture during the compression cycle is safely avoided.

As seen in FIG. 6a, which is shown with the ignition disconnected, from the point X1, the pressure in chamber section 7 rises, as shown on the curve section 7, more steeply than in chamber section 20, which continues along the curve section 7 and 20 shown between $X = 0$ and $X = X1$ extended from X1 and X2.

Figure 6:
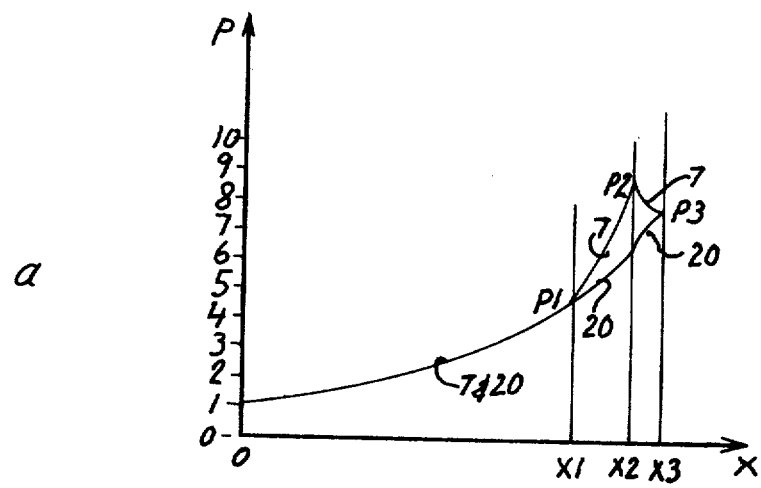
FIG. 6a is a diagram of cylinder pressure as a function of piston position from lower dead center through top dead center without ignition.
FIGS. 6b, c, d and e show in diagrammatic form, the piston in four (4) different positions.
Figure 6:
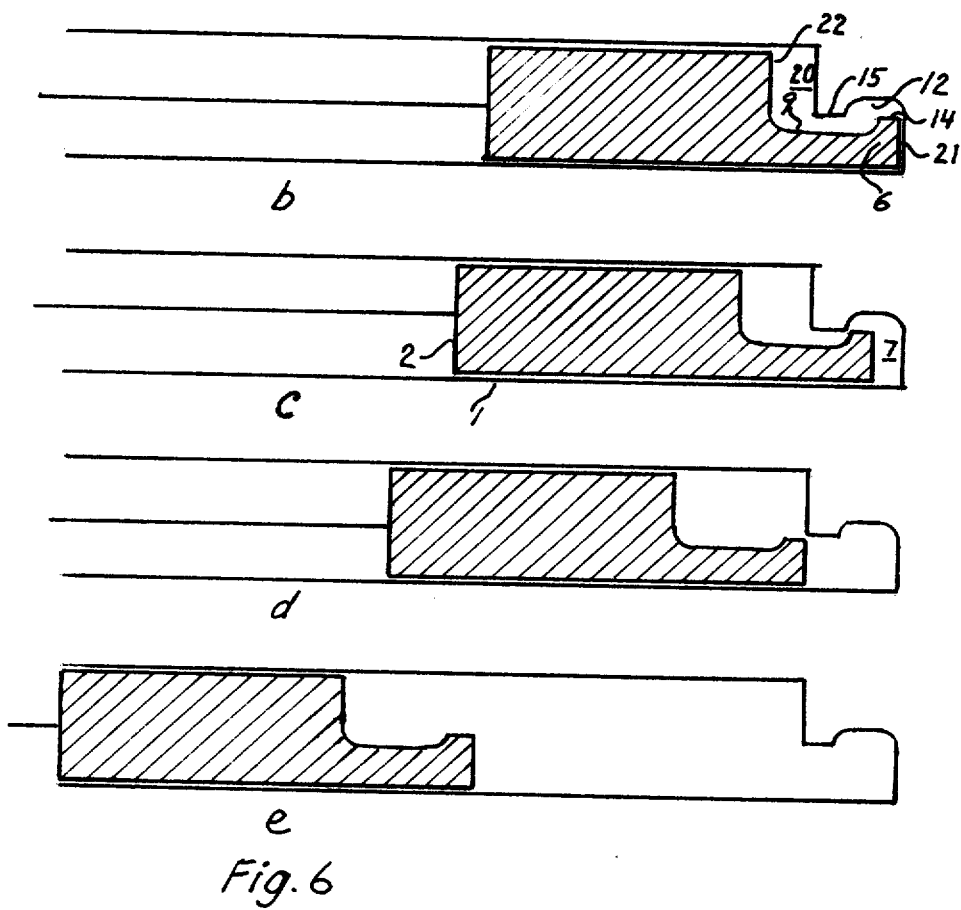

At the next point, where $X = X2$, the two (2) air passages, the passage 9 in the piston and the stationary air passage 12 begin to overlap, and thereby again establish an air passage between chamber sections 20 and 7 as seen in FIG. 6c. Since the pressure in 7 is now higher than in 20, the fuel-air mixture, which, until this point was contained in chamber section 7 under pressure somewhat higher than in 20, rushes out through this new air passage and into chamber section 20, thereby imparting to the fuel-air mixture contained in section 20, a strong swirling motion which takes place generally at the time a spark is generated in chamber section 20 by the spark plug 18, best seen in FIG. 5, but not shown in FIG. 6. It can further be shown that the piston and combustion chamber constructed according to the present invention, will have less tendency to produce engine knocking caused by premature ignition, due to prevention of "hot spots" in the rapidly swirling motion of the burning air mass.

Since the electrical means generating the power for the spark are of such a construction that a powerful spark of extended duration is produced, it follows that the mass of swirling fuel-air mixture in chamber 20 is thoroughly and intimately exposed to the flame of the spark, such that a very effective and sustained ignition process is established, even when a lean, slow burning fuel-air mixture is used.

To further enhance the start of the ignition process, the spark plug, in one preferred embodiment of the present invention, is positioned in the combustion chamber section 20 in a location adjacent to or directly in the path of the outrushing fuel-air mixture issuing under moderate pressure from the air passage 9, so that a highest possible degree of interaction between the ignition spark and the stream of fuel-air mixture is attained.

As is well known from the art of the design of internal combustion engines, the spark must be initiated a short time before the piston reaches top dead center, so that the fuel-air mass in the combustion chamber has time to become thoroughly ignited. In this way, the most fuel efficient engine operation is attained. An engine, according to the present invention, will present the outrushing fuel-air mixture from chamber section 7 also a short time before the piston reaches top dead center. The duration of that second short time is determined by several factors, such as the rotational velocity of the crankshaft and the geometry of the air passages 9 and 12 and the dimensions of the two (2) overlapping lips 14 and 15. It follows that the engine designer who is designing an engine according to the present invention, has the capability to choose said dimensions such that the outrush of fuel-air mixture from chamber section 7 can be made generally concurrent with the onset of ignition in chamber section 20.

In the foregoing disclosure, the present invention has been described by reference to two (2) coordinated combustion chamber sections that are configured such that each has a circumference in a plane perpendicular to the common axis of the cylinder and piston as two (2) half circles, separated by a diameter. It should be understood, however, that the dividing lines defining the parallel surfaces 23 and 24 separating the two (2) chamber sections may have other geometric shapes as may be chosen by the engine designer for optimal overall engine performance, as long as said surfaces are parallel with and in close proximity to each other, and each surface is described by a line parallel with said axis and said dividing lines.

Figure 7:
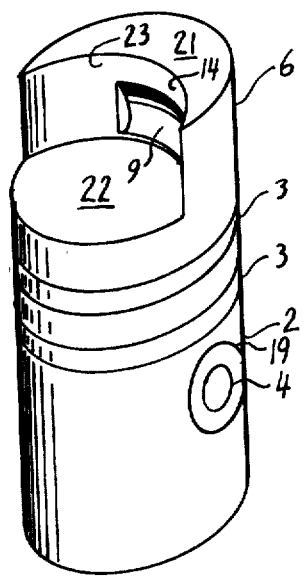
FIG. 7 is a perspective view of a piston with piston extension having a crescent shaped cross-section.

As an example, FIG. 7 shows a construction where the dividing lines are sections of a circle, resulting in a combustion chamber section 7, which is crescent shaped, and a chamber section 20, which is more nearly cylindrical in cross section, which benefits a stronger swirling air motion in the chamber. As another example, the combustion chamber section 20 may be shaped such as to support a swirling air motion, which is rotating about an axis, perpendicular to the axis of the cylinder and piston by suitably shaping the walls of combustion chamber 20, and positioning of the air passages 9 and 12.

In the foregoing disclosure, an internal combustion engine with the intake port connected to a carburetor has been described. It follows, that an engine using fuel injection in the intake manifold may benefit from the present invention as well. The same consideration applies to an engine with fuel injected into the cylinder. In this case, the enhanced circulation and swirling motion of the fuel-air mixture, during the time of ignition will contribute to a more thoroughly mixed and more homogeneous fuel-air mixture which enhances the efficiency of the ignition and combustion process.

OTHER EMBODIMENTS

The foregoing description has been directed generally toward an engine having electrical ignition. In another important class of internal combustion engines, the diesel engine, the ignition is effected by compressing atmospheric air drawn into the cylinder during the intake cycle to such a high degree of compression that the air in the combustion chamber is hot enough to ignite liquid fuel injected into the combustion chamber through a nozzle under very high pressure. The fuel is injected such that it enters the combustion chamber as a finely dispersed mist of droplets of fuel. In order to insure an efficient combustion process, these droplets must be evaporated and the vapors intimately mixed with the air in the combustion chamber during the short time available for combustion. For this reason, designers of diesel engines design the combustion chambers such that the greatest amount of swirling and turbulence is imparted to the air in the chamber, prior to injection of the fuel. An example of such a combustion chamber is disclosed in U.S. Pat. No. 2,907,308, issued Oct. 6, 1959.

The present invention lends itself to the construction of a diesel engine with a piston and combustion chamber, which can generate a large degree of swirling and turbulent air motion in the combustion chamber, timed such that the turbulence is generated immediately prior to the injection of liquid fuel into the combustion chamber. In operation, FIG. 1 will serve to also illustrate a diesel engine according to the present invention. A diesel engine will have a very small combustion chamber, such that the atmospheric air in the cylinder is compressed to a small volume at high temperature. This requires that the construction elements of the engine are designed for higher pressures than those required for an engine with spark ignition, but in all other respects, the compression cycle will proceed as described above. Instead of a spark plug in the combustion chamber section 20, a fuel injection nozzle will be inserted in the chamber. A metered fuel charge will be injected a short time prior to the time of top dead center. The air passages 12 and 9 are constructed such that the air compressed in combustion chamber 6 is released into chamber section 20, at the time of the injection of the fuel charge.

In still another embodiment of the present invention, it is applied to a so-called two cycle internal combustion engine. This engine principle, which is widely known and described in textbooks on internal combustion engines, may be applied to internal combustion engines using electric spark ignition or to engines of the diesel type wherein ignition is effected by injection of liquid fuel in a highly compressed air mass contained at high temperature in the combustion chamber.

In two cycle engines, the process of expelling the spent exhaust gases from the cylinder and the ingestion of new fuel-air mixture (or atmospheric air as required for the diesel engine) is performed during the time the piston is near its lower dead center postion. A two cycle engine cylinder with piston is shown in diagrammatic form in FIGS. 8 and 9. FIG. 8 shows a vertical part cross-sectional view through a cylinder, and an elevational view of a piston contained therein. The view is taken along a vertical plane along the line 8—8 of FIG. 9, and is perpendicular to the axis of the wrist pin. FIG. 9 shows a vertical part cross-sectional view of the same cylinder and piston along the line 9—9 of FIG. 8. The cylinder has an intake port 30 and exhaust port 31. An inlet 43 in the upper part of the piston communicates with the inlet port 30 and serves to project the air injected at inlet port 30 upward into the cylinder and combustion chamber cavity, so as to better expel the spent exhaust gas. This feature is normally provided on two-cycle engines. Since the present invention is not directed toward the general operation of a two cycle internal combustion engine, but is directed only toward the process of compressing and igniting fuel-air mixture in the cylinder of the electric spark version of the engine (or to the process of compressing the air in the cylinder and the ignition of the injected liquid fuel at the beginning of the combustion cycle of the diesel version), the other functions of the engine are not described here. Also, the various engine construction elements such as cooling means, lubrication means, crankshaft, flywheel and so forth are not, for the same reason, described here.

Describing first the spark ignition type engine, FIG. 8 shows a cylinder 33 containing a piston 32 moving upward in the cylinder, compressing fuel-air mixture in the combustion chamber in the top of the cylinder. As described above under the four cycle engine, the piston 32 has an extension 42 projecting upward from the top of the piston. The combustion chamber is divided into two sections, a first lower section 35 and a second upper section 36. When the piston is moving upward toward its upper dead center position, the piston extension 42, in the latter part of the cycle, enters and slides into said upper second combustion chamber section, and in its top dead center position, completely fills said second chamber section. The outer walls of the piston extension, and the inner walls of the second combustion chamber section are constructed with a tightly fitting connection with as little clearance as allowed by the tolerances between the piston and the cylinder wall, such that as the piston extension moves upward inside said second combustion chamber section, the fuel-air mixture captured in said second combustion section is compressed to a pressure somewhat higher than the pressure in said first combustion chamber section. As before, during the last part of the compression cycle, a moving indentation 40 in the inside wall of the piston extension 42, bounded by an upper horizontal moving lip 39, moves into engagement with a fixed indentation 38, bounded by a lower fixed, horizontal lip 37. As the two indentations start to overlap, they form a common air passage which allows the fuel-air mixture captured under compression in the second combustion chamber section 36, to escape into the fuel-air mixture compressed to a lower pressure in the first combustion chamber section, and thereby sets the fuel-air mixture in the latter chamber in an agitated swirling motion shortly before a spark from the spark plug 34 initiates the ignition and combustion process.

In the two cycle, diesel engine version of the engine, according to the present invention, only atmospheric air without fuel is injected into the cylinder before the beginning of the compression cycle, which, otherwise, proceeds in a manner similar to that described above for the two cycle spark ignition engine. Near the end of the compression cycle, the air captured in the second combustion chamber section under high pressure is released into the first combustion chamber section where hot air is compressed at a high pressure, but not as high as that of the air in the second combustion chamber section. The release takes place through the two overlapping, coordinated air passages, and thereby sets the air in the first chamber section in an agitated, swirling motion shortly before liquid fuel is injected into the first combustion chamber section. The fuel injection nozzle is preferably positioned such that the outrushing air stream is directed toward the injection nozzle, thereby aiding in the dispersion of the fuel in the combustion chamber, for more efficient and rapid combustion.

In the foregoing description of four-cycle engines, the intake valve was positioned with the second upper combustion chamber section while the exhaust valve was positioned with the lower first combustion chamber section. In still another embodiment of the invention, the position of the two valves are reversed such that the intake valve is positioned with the first lower combustion chamber section, and the exhaust valve with the upper second combustion chamber section.

In the foregoing description it has been implied that the maximal absolute pressure before ignition in the second combustion chamber section may rise above the maximal absolute pressure P3, before ignition, in the first combustion chamber section. This is the situation shown in FIG. 6a. It can be shown, however, that by judicious choice of the geometry of the coordinated partially overlapping air passages, an engine construction according to the present invention may be attained in which the absolute pressure in the second combustion chamber section before ignition, does not exceed the pressure P3 if such is of importance in the construction of the engine. In such a case, the point of the beginning overlap of the air passages will be chosen to take place at the time pressure in the second combustion chamber reaches the value P3. At that time, the pressure in the first combustion chamber section is still lower than P3 and enough compressional energy is stored in the compressed gas in the second combustion chamber section to cause a strong swirling and turbulent motion in the first combustion chamber section as it is suddenly released into said first chamber section.

SUMMARY

In the foregoing disclosure, four types of internal combustion engines, namely an electric spark-ignited and a diesel engine, each one in a four-cycle and a two-cycle version have been described, where the engines are provided with an arrangement for improved air and fuel circulation in the combustion chamber prior to ignition, due to a specially constructed piston and coordinated combustion chamber.

The engines have been described on the assumption that air or fuel-air mixture is ingested at atmospheric pressure. Many engines of the high performance type also operate behind superchargers which serve to raise the pressure of the intake air for enhanced engine performance. It follows, that an engine, according to the present invention, may be operated behind a supercharger without loss of the benefits described.

During the exhaust cycle following the combustion cycle, the piston is again driven upward, expelling the spent exhaust gases. During the latter part of the exhaust cycle, a part of the exhaust gases are captured in the combustion chamber section 7, as were the fuel-air mixture during the compression cycle. This part of the exhaust gases are compressed moderately, and at the last part of the cycle, released as a puff into the combustion chamber section 20, when the air passages 9 and 12 again overlap during the last part of the cycle.

It should be understood that other embodiments of the invention may be devised by those skilled in the art, and which fall within the scope of the invention.

Having now described the operation of the present invention and several embodiments thereof, I claim:

1. In an internal combustion engine comprising at least one cylinder with a combustion chamber, a piston disposed coaxially, slidably, reciprocally movable between an upper and lower dead center position inside said cylinder, said piston having generally horizontal upper surfaces, said cylinder having an intake port and an exhaust port, means for opening and closing said ports in a timed relationship with the movement of said piston, means for delivery of fuel and air to said cylinder, means for igniting fuel and air combined in said cylinder, means for transfer of energy produced from the expansion of hot gasses resulting from the combustion of said combination of fuel and air, from said piston to an external recipient of said energy, the improvement further comprising:

a first combustion chamber section defined by part of the upper surface of said piston, and the top of the cylinder walls;

a second combustion chamber section defined by the walls and the top of said cylinder, and the upper surface of a piston extension;

said piston extension coordinated with said second combustion chamber section such that said piston extension is slidably received inside said second combustion chamber section, and such that gas captured inside said second combustion chamber section is compressed, and wherein said piston extension and said second combustion chamber section have coordinated air passages such disposed that during the last part of the piston's upward movement, said air passages become partially overlapping, thereby providing a common passage for the gas contained in compressed condition in said second combustion chamber section to said first combustion chamber section, such that the gas contained therein can escape, thereby imparting to the gas in said first combustion chamber section an agitated swirling motion.

2. In an internal combustion engine as defined in claim 1 further configured as a four-cycle engine wherein said intake port is connected with a source for fuel and air mixture, and has an intake valve, and wherein said exhaust port has an exhaust valve and wherein said means for transfer of energy from said piston to an external recipient consist of a connecting rod connected with a crankshaft, and wherein said combustion chamber has at least one sparkplug, further comprising means for operating said valves and said sparkplug in a timed relationship with said crankshaft.

3. An internal combustion four-cycle engine as defined in claim 2, wherein:

said piston extension is defined by an upper surface, said upper surface disposed in a plane generally perpendicular to the axis of said cylinder, an outer cylindrical surface, said cylindrical surface an extension of the cylindrical surface of the piston, an inner surface, said inner surface defined by a straight line parallel with the axis of said cylinder, said straight line traversing a dividing line, said dividing line intersecting the upper circular surface of said piston, and wherein:

said second combustion chamber section is bounded by surfaces that closely conform to the surfaces of said piston extension, such that with the piston positioned in its upper dead center, said piston extension occupies the space of said second combustion chamber section, and said piston extension is slidably received by said second combustion chamber section.

4. An internal combustion, four-cycle engine as defined in claim 3, wherein:

said dividing line is defined by the intersection of the upper surface of said piston and a plane parallel with the axis of said cylinder.

5. An internal combustion four-cycle engine as defined in claim 3, wherein said air passages consist of:

a moving indentation in said inner surface of said piston extension, said indentation bounded at the top by a horizontal moving lip, and a fixed indentation in the second combustion chamber wall, said fixed indentation bounded at the underside by a horizontal lip, said fixed indentation coordinated with said moving indentation, and said moving lip such that as the piston approaches its upper dead center position, said moving indentation straddles said fixed lip, and such that said fixed and moving indentation together form a common air passage which enables the fuel-air mixture contained in compressed condition in said second combustion section above the upper surface of said piston extension, at a pressure that is higher than the pressure in said first combustion chamber section, to escape into the fuel-air mixture contained in said first combustion chamber section, thereby imparting to the fuel-air mixture in said first combustion chamber section an agitated swirling motion.

6. An internal combustion four-cycle engine as defined in claim 2, wherein:

said operating means for operating said sparkplug provide a spark of high intensity and extended duration.

7. An internal combustion four-cycle engine as defined in claim 6, wherein:

said sparkplug is disposed in said first combustion chamber section such that the spark is exposed to the stream of fuel-air mixture rushing out from said second combustion chamber section, as the piston approaches the end of the compression cycle.

8. An internal combustion engine as defined in Claim 1, wherein said internal combustion engine is a two-cycle engine wherein said intake and exhaust ports are disposed in said cylinder walls, and wherein said means for opening and closing said ports consist of the walls of said piston, such that said ports are opened when the piston is in its lower dead center and again closed when the piston moves upward, beginning the compression cycle, the improvement comprising:

a first combustion chamber section defined by the upper surface of said piston, the top of the cylinder and cylinder walls;

a second combustion chamber section defined by the walls and top of said cylinder and the upper surface of a piston extension, said piston extension coordinated with said second combustion chamber section such that said piston extension is slidably received inside said second combustion chamber section during the later part of the piston's upward movement, and such that in its upper dead center position, said piston extension occupies said second combustion chamber section, and such that gas captured inside said second combustion chamber section is compressed, and wherein said piston extension and said second combustion chamber section have coordinated air passages such disposed that during the last part of the piston's upward movement, said air passages become partly overlapping, thereby providing a common air passage for the gas contained in said second combustion chamber section compressed to a pressure higher than the pressure in aforesaid first combustion chamber section, to said first combustion chamber section, whereby the gas such released imparts to the gas in said first combustion chamber section an agitated swirling motion.

9. An internal combustion engine as defined in claim 8, wherein:

said means for igniting fuel and air combined in said cylinder comprise at least one sparkplug disposed in said first combustion chamber;

said means for operating said sparkplug such constructed that a spark of high intensity and extended duration is produced in a timed relationship with the movement of said piston;

said means for transfer of energy from said piston to an external recipient consist of a crankshaft connected with said piston with a connecting rod.

10. An internal combustion engine as defined in Claim 8, wherein:

said means for delivery of fuel to said cylinder consist of a fuel injection nozzle, said nozzle operating in a timed relationship with said piston to inject fuel into said first combustion chamber section at a short time before the time of the piston's top dead center position, said means for igniting said combination of fuel and air, is atmospheric air compressed in said first combustion chamber section to such a high degree of compression that the air is heated to a temperature above the ignition temperature of said injected fuel.

11. In an internal combustion four-cycle engine comprising at least one cylinder with a combustion chamber, a piston disposed coaxially, slidably inside said cylinder, said piston having generally horizontal upper surfaces, said combustion chamber having an intake port with an intake valve, said intake port connected to the atmosphere and an exhaust port with exhaust valve for expelling spent exhaust gasses, a connecting rod connecting said piston with a crankshaft, said combustion chamber having an injection nozzle for injecting liquid fuel into said combustion chamber, operating and timing means for operating said valves and said injection nozzle in a timed relationship with said crankshaft, the improvement further comprising:

a first combustion chamber section defined by cylinder walls, cylinder top, inner surface of exhaust valve and part of upper piston surface, said combustion chamber having a fuel injection nozzle;

a second combustion chamber section defined by cylinder walls, cylinder top, inner surface of intake valve and the upper surface of a piston extension;

said piston extension coordinated with said second combustion chamber section, such that said piston extension slides into said second combustion chamber section during the later part of the piston's upward movement and occupies said second combustion chamber section, thereby compressing the air contained in said second combustion chamber section to a higher pressure than the pressure in said first combustion chamber sections;

said piston extension and said second combustion chamber section having coordinated air passages, such disposed that air pasages during the last part of the piston's upward movement overlap and provide an escape passage for the air compressed in said second combustion chamber section to said first combustion chamber section, such that said compressed air is expelled into said first combustion chamber section, thereby imparting to the compressed air in said first combustion chamber section an agitated swirling motion.

12. An internal combustion four-cycle engine as defined in claim 11, wherein:

said piston extension is defined by a segment of an upper circular surface, said upper surface disposed in a plane generally perpendicular to the axis of said cylinder, an outer cylindrical surface, said outer cylindrical surface an extension fo the cylindrical surface of the piston, an inner surface, said inner surface defined by a straight line traversing a dividing line, said dividing line intersecting the upper segmented circular surface of said piston and wherein:

said second combustion chamber section is bounded by surfaces that closely conform to the surfaces of said piston extension such that, with the piston positioned in its upper dead center, said piston extension occupies the space of said second combustion chamber section, and said piston extension is slidably contained by said second combustion chamber section.

13. An internal combustion four-cycle engine as defined in claim 12, wherein:

said dividing line is defined by the intersection of the upper circular surface of said piston and a plane parallel with the axis of said cylinder.

14. An internal combustion four-cycle engine as defined in claim 13, wherein said air passages consist of:

a moving indentation in said inner surface of said piston extension, said indentation bounded at the top by a horizontal moving lip and a fixed indentation in the second combustion chamber wall, said fixed indentation bounded at the underside by a fixed horizontal lip, said fixed indentation coordinated with said moving indentation and said moving lip such that, as the piston approaches its upper dead center position, said moving indentation straddles said fixed lip, and such that said fixed and said moving indentations together form a common air passage which enables the air contained in compressed condition in said second combustion chamber section above the upper surface of said piston extension at a pressure that is higher than the pressure in said first combustion chamber section, to escape into said first combustion chamber section, thereby imparting to the air contained in said first combustion chamber section an agitated swirling motion.

15. An internal combustion four-cycle engine as defined in claim 8, wherein said fuel injection nozzle is disposed in said first combustion chamber section in such a position that the stream of air rushing out from said second combustion chamber section near the end of the compression cycle, is directed toward said fuel injection nozzle.

* * * * *